No. 677,419. Patented July 2, 1901.
W. E. LOTT.
CUTTING IMPLEMENT.
(Application filed June 27, 1900.)

(No Model.)

Witnesses
Louis D. Heinrichs
Herbert D. Lawson

Inventor
W.m E. Lott,
By Victor J. Evans
Attorney

UNITED STATES PATENT OFFICE.

WILLIAM E. LOTT, OF MINEOLA, TEXAS.

CUTTING IMPLEMENT.

SPECIFICATION forming part of Letters Patent No. 677,419, dated July 2, 1901.

Application filed June 27, 1900. Serial No. 21,807. (No model.)

*To all whom it may concern:*

Be it known that I, WILLIAM E. LOTT, a citizen of the United States, residing at Mineola, in the county of Wood and State of Texas, have invented new and useful Improvements in Cutting Implements, of which the following is a specification.

This invention relates to new and useful improvements in cutting implements especially adapted for severing bale-ties, cutting wire, pruning trees, &c. Its primary object is to provide a device of simple and durable construction which may be readily operated and the blades of which can be removed when desired.

To these ends the invention consists in the novel construction and combination of parts hereinafter more fully described and claimed, and illustrated in the accompanying drawings, showing the preferred form of my invention, and in which—

Figure 1:
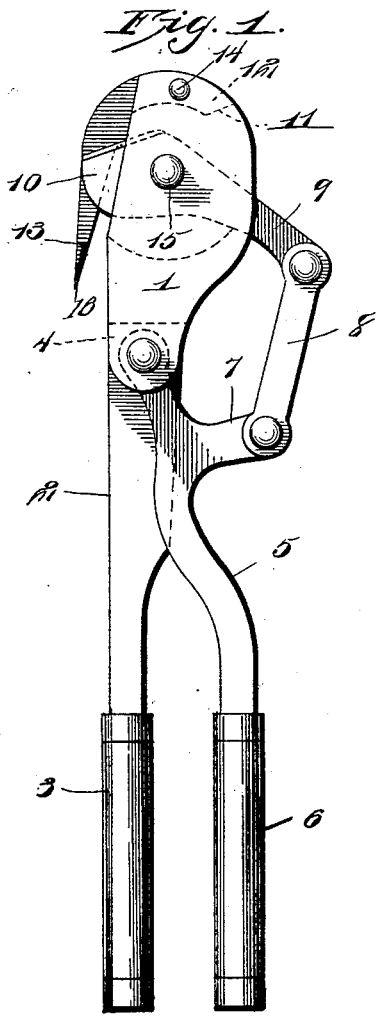
Figure 2:
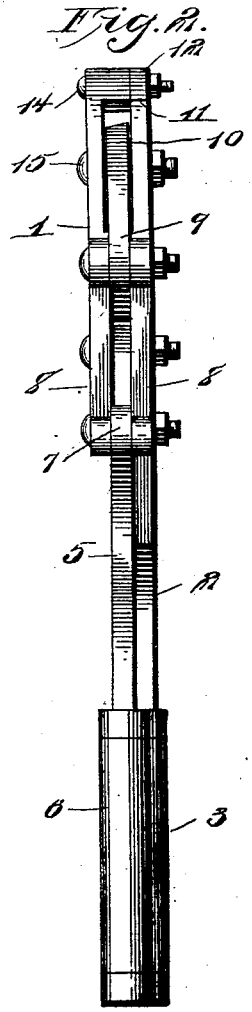
Figure 3:
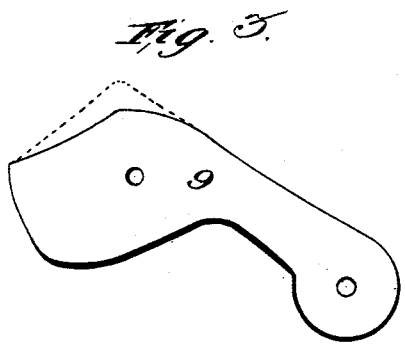

Figure 1 is a side elevation. Fig. 2 is an edge view. Fig. 3 is a detail view of the pivoted cutting-blade, showing in dotted lines a second form of blade which may be employed.

Referring to the drawings by reference-numerals, 1 designates the head of the device, having a shank 2 formed therewith, said shank being provided with a handle, as at 3. The head 1 is provided at its lower end with a recess or groove 4, within which is pivoted the end of a lever 5, having a handle 6 at the free end thereof. An arm 7 extends from the lever and is connected by means of links 8 with an arm 9, extending from a cutting-blade 10, which is pivoted within the head 1, as shown.

A groove 11 is formed at the upper end of the head 1 and receives the stem 12 of a wedge-shaped inwardly-extending cutting-blade 13. This stem is detachably secured in position in any suitable manner by means of a bolt 14, and the end of the blade 13 is preferably rounded and pointed, as shown at 16.

It will be seen that by removing the pivot-pin 15 and the bolt 14 the cutting-blades can be readily removed. If desired, a blade having its cutting edge arranged as shown in dotted lines in Fig. 3 may be employed. This is especially adapted for use in cutting tin, &c. It will thus be seen that the tool can be used to advantage in removing tin roofs.

From the foregoing description, taken in connection with the accompanying drawings, the construction, operation, and advantages of my improved cutting implement will be readily apparent without requiring an extended explanation. It will be seen that the device is simple of construction, that said construction permits of its manufacture at small cost, and that it is exceedingly well adapted for the purposes for which it is designed, and it will of course be understood that various changes in the form, proportion, and the minor details of construction may be resorted to without departing from the principle or sacrificing any of the advantages of this invention.

Having thus described the invention, what is claimed as new, and desired to be secured by Letters Patent, is—

The combination with a head, of a shank thereto, a handle upon the shank, a lever, one end of which is pivoted within the inner end of the head, a handle to the lever, a laterally-extending arm to said lever, a detachable cutting-blade projecting through and pivoted within the head, a link connection between said blade and the arm of the lever, an inwardly-extending cutting-blade, a stem thereto seated within a recess in the end of the head and a bolt for detachably securing the stem in said recess.

In testimony whereof I affix my signature in presence of two witnesses.

WILLIAM E. LOTT.

Witnesses:
 ARTHUR SOULE,
 DAN ALBRIGHT.